(12) United States Patent
Sadakata et al.

(10) Patent No.: US 9,862,283 B2
(45) Date of Patent: Jan. 9, 2018

(54) NON-CONTACT CHARGING APPARATUS HAVING DIFFERENTLY SIZED EXPOSED REGIONS ON OPPOSING FACES OF MAGNETIC BODY

(71) Applicant: PANASONIC INTELLECTUAL PROPERTY MANAGEMENT CO., LTD., Osaka (JP)

(72) Inventors: Hideki Sadakata, Shiga (JP); Atsushi Fujita, Shiga (JP); Yoshiharu Omori, Shiga (JP); Daisuke Bessyo, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 14/866,804

(22) Filed: Sep. 25, 2015

(65) Prior Publication Data
US 2016/0016477 A1    Jan. 21, 2016

Related U.S. Application Data

(63) Continuation of application No. PCT/JP2014/000838, filed on Feb. 19, 2014.

(30) Foreign Application Priority Data

Mar. 27, 2013  (JP) .................................. 2013-065853

(51) Int. Cl.
*H02J 7/00* (2006.01)
*B60L 11/18* (2006.01)
(Continued)

(52) U.S. Cl.
CPC .......... *B60L 11/182* (2013.01); *H01F 27/306* (2013.01); *H01F 27/362* (2013.01);
(Continued)

(58) Field of Classification Search
CPC ....................................................... H02J 7/025
(Continued)

(56) References Cited

U.S. PATENT DOCUMENTS

| 7,948,208 | B2 * | 5/2011 | Partovi | ................. | H02J 7/0027 320/108 |
|---|---|---|---|---|---|
| 7,952,322 | B2 * | 5/2011 | Partovi | .................. | H01F 5/003 320/108 |

(Continued)

FOREIGN PATENT DOCUMENTS

| CN | 1762082 A | 4/2006 |
|---|---|---|
| JP | 2002-305120 A | 10/2002 |

(Continued)

OTHER PUBLICATIONS

Extended European Search Report issued in corresponding European Patent Application No. 14774806.5, dated Mar. 29, 2016.
(Continued)

*Primary Examiner* — Yalkew Fantu
(74) *Attorney, Agent, or Firm* — McDermott Will & Emery LLP

(57) ABSTRACT

The present disclosure provides a non-contact charging apparatus including a power transmitting coil and a power receiving coil which face each other. At least one of the power transmitting coil or the power receiving coil includes a magnetic body and a coil wound around the magnetic body. The magnetic body has, on both end portions, exposed regions in which the wound coil is absent. One of the exposed regions that is on a face facing the power transmitting coil or the power receiving coil is larger than another one of the exposed regions that is on a face not facing the power transmitting coil or the power receiving coil.

4 Claims, 11 Drawing Sheets

(51) Int. Cl.
    *H01F 38/14*    (2006.01)
    *H02J 7/04*     (2006.01)
    *H01F 27/30*    (2006.01)
    *H01F 27/36*    (2006.01)
    *H02J 17/00*    (2006.01)
(52) U.S. Cl.
    CPC ................ *H01F 38/14* (2013.01); *H02J 7/04* (2013.01); *H02J 17/00* (2013.01)
(58) Field of Classification Search
    USPC ........................................................ 320/108
    See application file for complete search history.

(56) References Cited

U.S. PATENT DOCUMENTS

| | | | |
|---|---|---|---|
| 9,312,728 B2 | 4/2016 | Baarman et al. | |
| 2006/0029487 A1 | 2/2006 | Loibl | |
| 2007/0131505 A1 | 6/2007 | Kim | |
| 2008/0068212 A1* | 3/2008 | Tay | G08C 15/00 340/870.02 |
| 2010/0277121 A1* | 11/2010 | Hall | B60L 11/182 320/108 |
| 2011/0089768 A1 | 4/2011 | Byrne et al. | |
| 2012/0119914 A1* | 5/2012 | Uchida | H02J 5/005 340/584 |
| 2012/0262002 A1* | 10/2012 | Widmer | H04B 5/0037 307/104 |
| 2014/0084697 A1 | 3/2014 | Yasuda et al. | |

FOREIGN PATENT DOCUMENTS

| | | | |
|---|---|---|---|
| JP | 2008-087733 A | | 4/2008 |
| JP | 2012-151311 | * | 8/2012 |
| JP | 2012-151311 A | | 8/2012 |
| JP | 2012-231603 A | | 11/2012 |
| JP | 2013-219210 A | | 10/2013 |
| WO | 2012/099170 A1 | | 7/2012 |

OTHER PUBLICATIONS

International Search Report and Written Opinion issued in corresponding International Application No. PCT/JP2014/000838, dated Jun. 3, 2014; 9 pages with partial English translation.

* cited by examiner

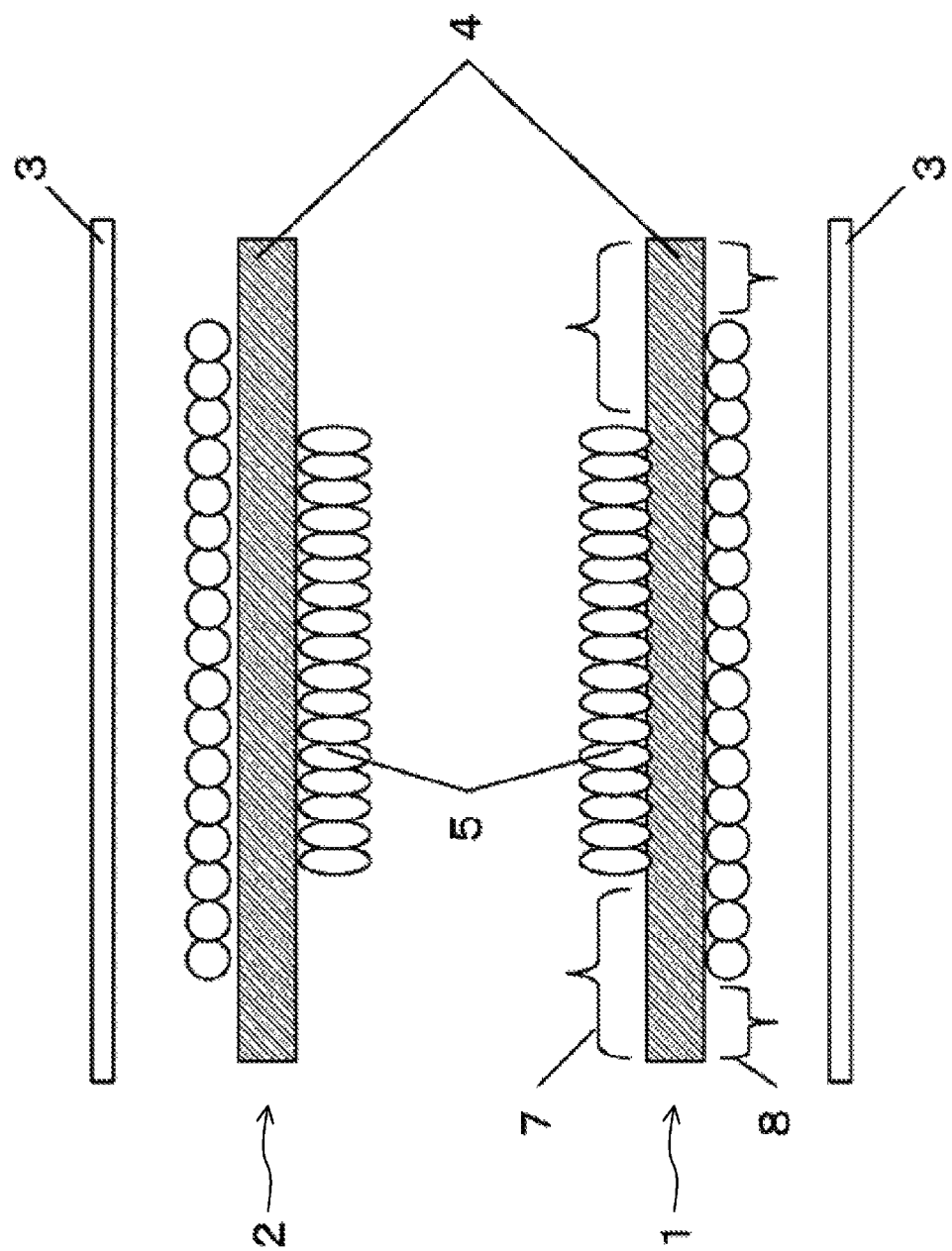

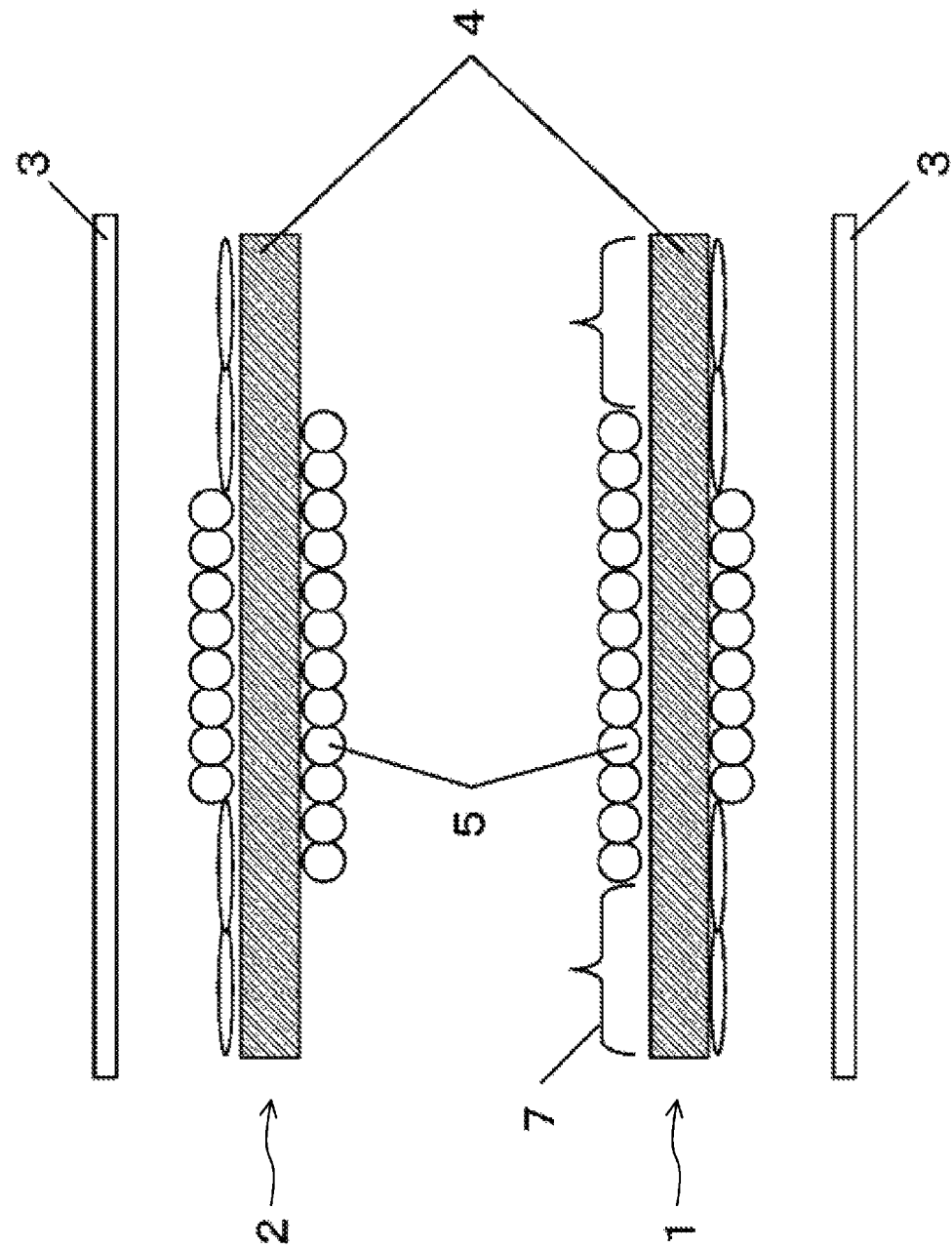

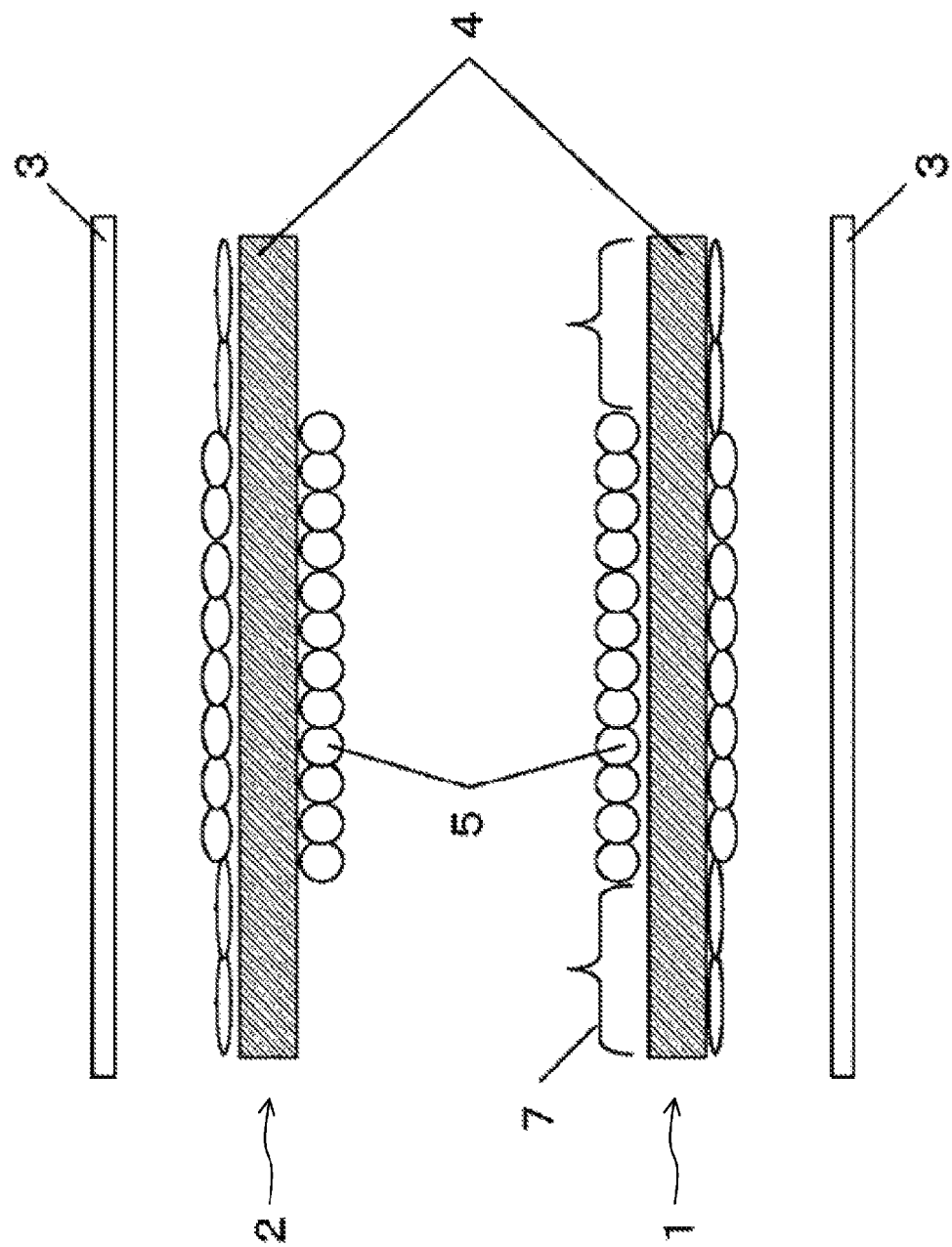

NON-CONTACT CHARGING APPARATUS HAVING DIFFERENTLY SIZED EXPOSED REGIONS ON OPPOSING FACES OF MAGNETIC BODY

CROSS-REFERENCE TO RELATED APPLICATION

This is a continuation of International Application No. PCT/JP2014/000838 filed on Feb. 19, 2014, which claims priority to Japanese Patent Application No. 2013-065853 filed on Mar. 27, 2013. The entire disclosures of these applications are incorporated by reference herein.

BACKGROUND

The present disclosure relates to a non-contact charging apparatus for charging electric propulsion vehicles such as electric vehicles and plug-in hybrid vehicles.

FIG. 11 is a cross-sectional view showing a power transmitting coil 101, a power receiving coil 102, and magnetic-shielding aluminum plates 103 of a non-contact charging apparatus of the known art. In FIG. 11, each of the power transmitting coil 101 and the power receiving coil 102 includes a magnetic bar member 104 and a coil 105 wound around the magnetic bar member 104. A main magnetic flux 106 generated at the power transmitting coil 101 goes out of a magnetic pole portion 107 of the power transmitting coil 101, and then enters a magnetic pole section 108 of the power receiving coil 102. The main magnetic flux 106 then passes through the magnetic bar member 104 of the power receiving coil 102, goes out of a magnetic pole section 107 of the power receiving coil 102, and enters a magnetic pole portion 108 of the power transmitting coil 101. In this manner, a magnetic flux loop is formed. This main magnetic flux 106 magnetically couples the power transmitting coil 101 to the power receiving coil 102, thereby transmitting electric power via a non-contact method. The magnetic-shielding aluminum plates 103 are intended to prevent magnetic fluxes from leaking to the back faces of the power transmitting and receiving coils 101 and 102, and arranged beside the back faces of these coils 101 and 102 (see, for example, Japanese Unexamined Patent Publication No. 2012-151311).

SUMMARY

However, the power transmitting coil 101 and the power receiving coil 102 configured as shown in FIG. 11 easily radiate magnetic fluxes from their magnetic pole portions 107 and 108. Therefore, part of the main magnetic flux 106 generated at the power transmitting coil 101 magnetically couples the power transmitting coil 101 to, instead of the power receiving coil 102, the magnetic-shielding aluminum plate 103 arranged in the vicinity, and thereby forms an unwanted flux loop. As a result, the magnetic-shielding aluminum plate 103 is heated. Thus, this configuration has problems to be solved: the user may have a burn, and the efficiency of charging is reduced, for example.

Further, if an electric propulsion vehicle experiences the reduction of the efficiency of charging and has the possibility of heat generation as described above, the fuel economy will be prevented from being improved. In addition, the safety of the vehicle may be endangered.

In view of the foregoing, it is therefore an object of the present disclosure to provide a non-contact charging apparatus which is capable of improving its efficiency of charging and its safety by reducing the magnetic coupling between a power transmitting coil, a power receiving coil, and magnetic-shielding aluminum plates arranged near the coils.

A non-contact charging apparatus of the present disclosure includes a power transmitting coil and a power receiving coil which face each other. At least one of the power transmitting coil or the power receiving coil includes a magnetic body and a coil wound around the magnetic body. The magnetic body has, on both end portions, exposed regions in which the wound coil is absent. Out of the exposed regions, one which is on a face of the magnetic body facing the power transmitting coil or the power receiving coil is larger than another one which is on a face of the magnetic body not facing the power transmitting coil or the power receiving coil.

The present disclosure allows for improving the efficiency of charging by reducing the magnetic coupling between a power transmitting coil, a power receiving coil, and a magnetic-shielding aluminum plate arranged near the power transmitting or receiving coil, without preventing the magnetic coupling between the power transmitting and receiving coils.

BRIEF DESCRIPTION OF THE DRAWINGS

FIG. 4 is a cross-sectional view showing a non-contact charging apparatus according to a first variation of the present disclosure.

FIG. 5 is a cross-sectional view showing a non-contact charging apparatus according to a second variation of the present disclosure.

FIG. 6 is a cross-sectional view showing a non-contact charging apparatus according to a third variation of the present disclosure.

DETAILED DESCRIPTION

Embodiments of the present disclosure will be described in detail with reference to the drawings. Note that the present disclosure is not limited to the following embodiments. Various changes and modifications may be made without departing from the scope of the present disclosure.

Figure 1:
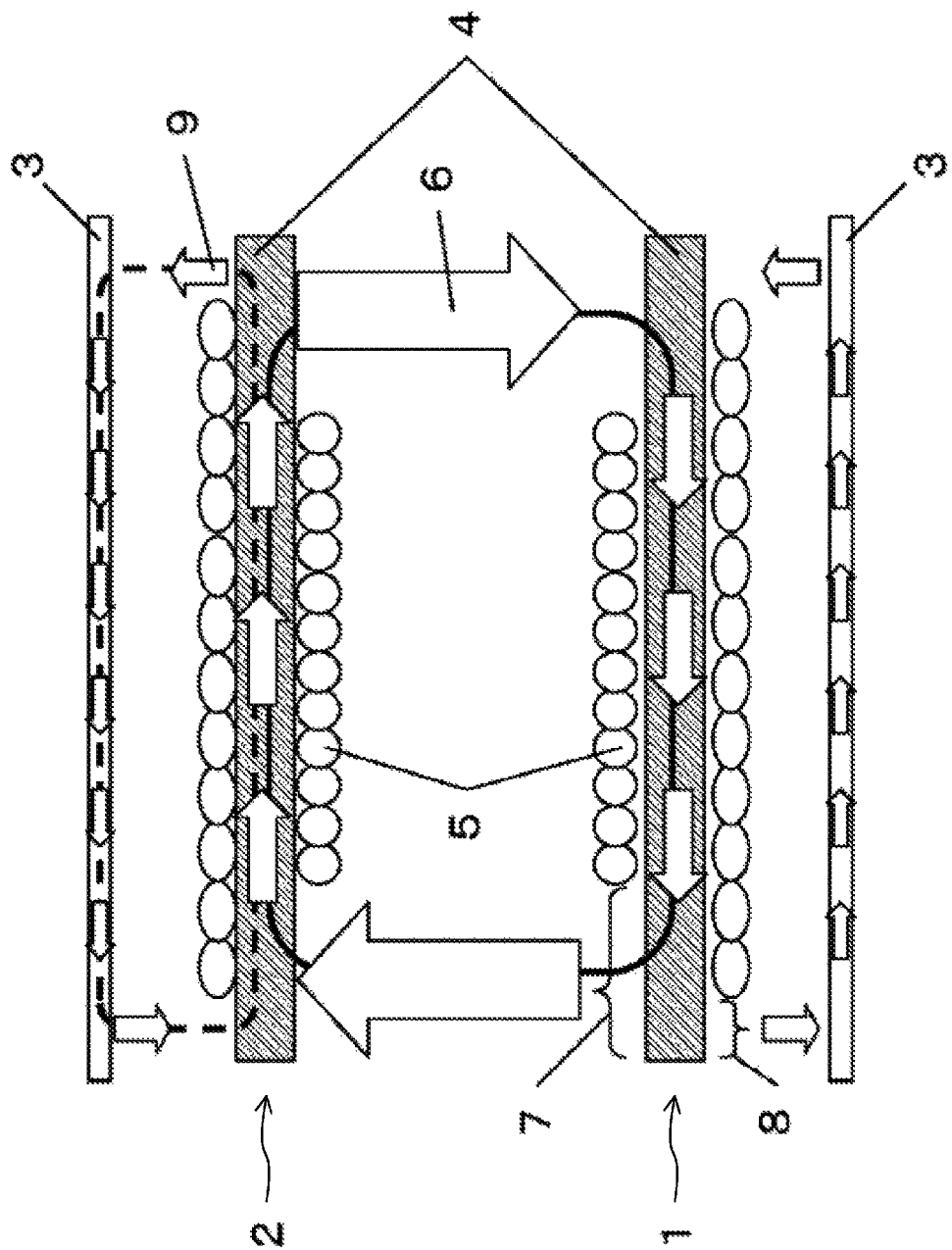
FIG. 1 is a cross-sectional view showing a non-contact charging apparatus according to an embodiment of the present disclosure.

FIG. 1 is a cross-sectional view showing a non-contact charging apparatus according to an embodiment of the present disclosure.

The non-contact charging apparatus of this embodiment includes a power transmitting coil 1 and a power receiving coil 2 that face each other. Specifically, the non-contact charging apparatus includes the power transmitting coil 1 that is positioned near the ground, the power receiving coil 2 that is positioned near a vehicle, and magnetic-shielding aluminum plates 3 that are each provided beside the power transmitting and receiving coil 1 or 2. Each of the power transmitting and receiving coils 1 and 2 includes a magnetic bar member (a magnetic body) 4 and a coil 5 wound around the magnetic bar member 4.

As shown in FIG. 1, each magnetic bar member 4 of the non-contact charging apparatus has, on both end portions, exposed regions 7 and 8 in which the wound coil 5 is absent. Each exposed region 7 which is on a face that faces the power transmitting coil 1 or the power receiving coil 2 is larger than each exposed region 8 which is on a face that does not face the power transmitting coil 1 or the power receiving coil 2 (specifically, that faces the associated magnetic-shielding aluminum plate 3). In other words, the coil 5 of the power transmitting coil 1 is wound around a middle portion of the magnetic bar member 4, and on the magnetic bar member 4, the region covered by the coil 5 is larger on the face facing the associated magnetic-shielding aluminum plate 3 than on the face facing the power receiving coil 2. Thus, the magnetic bar member 4 has the exposed regions that are not covered with coil 5, and out of these regions, each exposed region 7 (hereinafter referred to as the inward region 7) that faces the power receiving coil 2 is larger than each exposed region 8 (hereinafter referred to as the outward region 8) that faces the associated magnetic-shielding aluminum plate 3.

Figure 2:
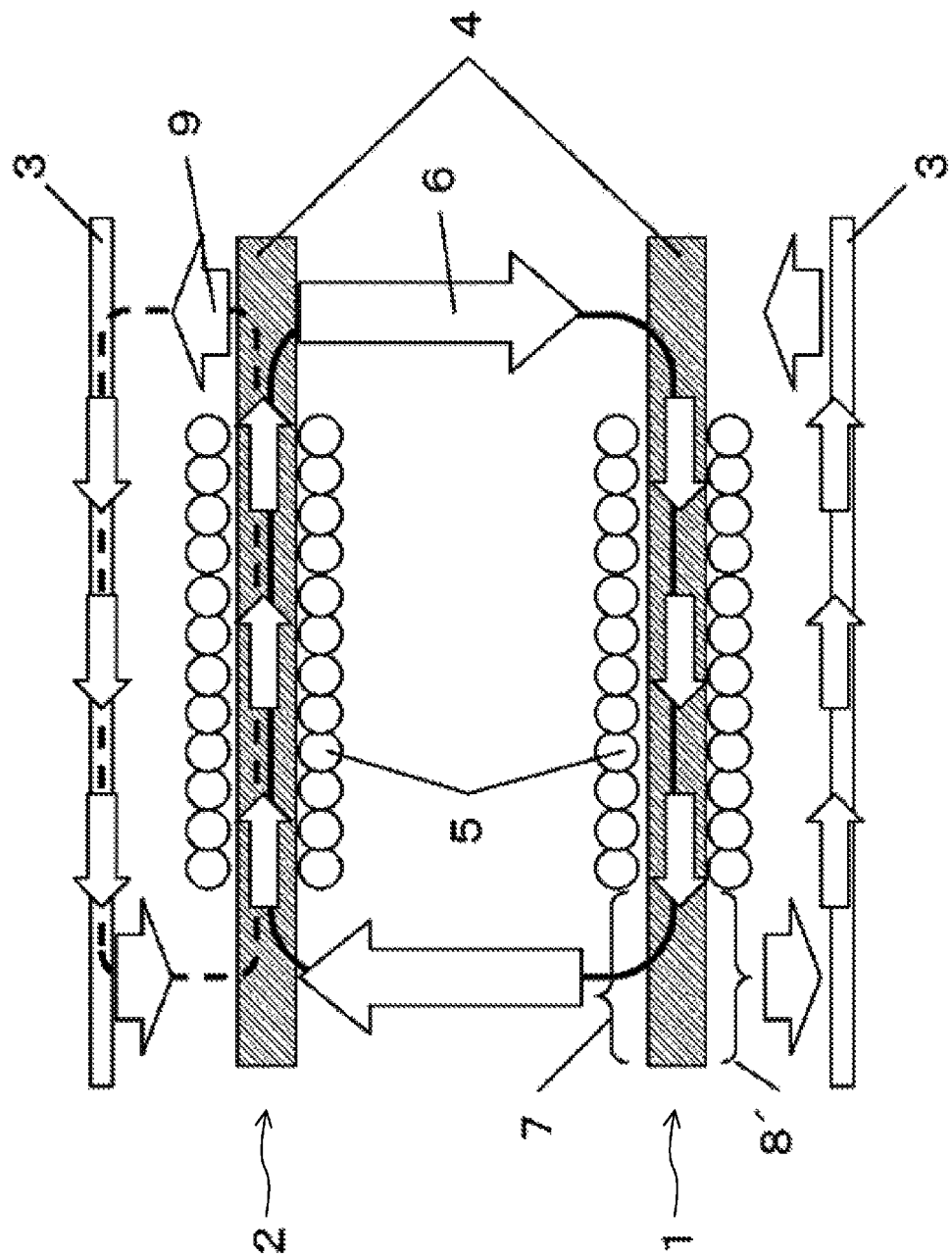
FIG. 2 shows an example comparative to a non-contact charging apparatus of an embodiment of the present disclosure.

FIG. 2 shows a comparative example in order that advantages provided by this embodiment will be understood better. In the comparative example shown in FIG. 2, the inward region 7 is as large as the outward region 8.

With reference to FIGS. 1 and 2, differences in the generated unwanted flux loop between these configurations will be described. The main magnetic flux generated at the power transmitting coil 1 is transmitted, via one of the inward regions 7, to one of the inward regions 7 of the power receiving coil 2, thereby generating a loop of the main magnetic flux 6. However, not all of the main magnetic flux 6 generated at the power transmitting coil 1 is transmitted via the inward region 7 to the power receiving coil 2. The main magnetic flux radially diffuses from the portions of the magnetic bar member 4 that are not covered with the coil 5. That is to say, the main magnetic flux diffuses not only toward the power receiving coil 2, but also in other directions. At this time, part of the main magnetic flux forms unwanted flux loops between the power transmitting coil 1 and the associated magnetic-shielding aluminum plate 3.

The amount of the magnetic fluxes that diffuse, that is, the amount of the magnetic fluxes that are lost as unwanted flux loops 9 is influenced by surface areas from which the magnetic fluxes diffuse. Therefore, an increase in the surface areas from which the diffusion of magnetic fluxes is desired (i.e., the surface areas of the inward regions 7 in this embodiment) and a decrease in the surface areas from which no diffusion of magnetic fluxes is desired (i.e., the surface areas of the outward regions 8 in this embodiment) allow for reducing the densities of the unwanted magnetic fluxes. As a result, the efficiency of electric power transmission from the power transmitting coil 1 to the power receiving coil 2 is improved.

Accordingly, in the configuration of FIG. 2 where each inward region 7 is as wide as each outward region 8, the unwanted flux loops that are generated therein are greater than those generated in the configuration of FIG. 1, and the efficiency of electric power transmission becomes lower than that of the configuration of FIG. 1. On the other hand, the configuration of FIG. 1 where each outward region 8 is narrower than each inward region 7 allows for reducing the loss of the main magnetic flux and increasing the efficiency of electric power transmission. In addition, the interruption and reduction of the unwanted flux loops 9 allow for improving the efficiency of charging and the safety without causing unwanted heating of the magnetic-shielding aluminum plates 3.

Figure 3B:
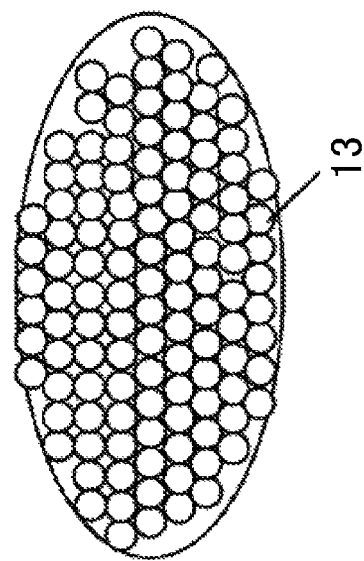
FIGS. 3A and 3B are cross-sectional views of a Litz wire.
Figure 3A:
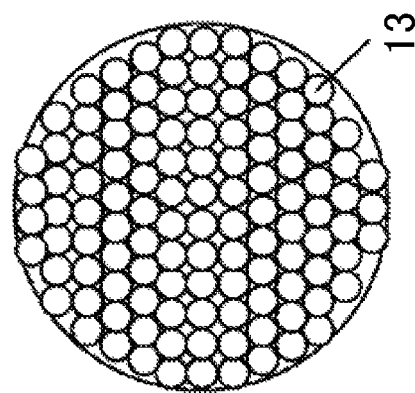

FIGS. 3A and 3B show an example of the coil 5 to be used in this embodiment. The coil 5 is made of a Litz wire that is a bundle of a plurality of element wires 13. The use of the Litz wire enables the coil diameter to be freely varied along the turns of the wounded coil. Therefore, as shown in FIGS. 3A and 3B, the coil diameter in the horizontal direction (the direction in which the coil 5 is wounded) can be made larger in the region facing the magnetic-shielding aluminum plate 3 than in the region facing the power receiving coil 2. Therefore, the inward region 7 and the outward region 8 can have different widths while the number of turns of the coil on the inward face of the magnetic bar member 4 is the same as that on the outward face.

In this embodiment, the use of a Litz wire has been described as an example. However, any type of coil may be used, as long as the coil diameter can be varied along the turns of the wound coil.

(First Variation)

FIG. 4 shows a variation in which portions of the wound coil 5 that extend on the inward face of each magnetic bar member 4 have a vertically-oriented oval cross section. With this configuration, the number of the turns of the wound coil 5 increases, as compared to the case shown in FIG. 1 where the portions of the wound coil 5 that extend on the outward face has a horizontally-oriented oval cross section. Thus, this configuration with a larger number of the turns of the wound coil allows for further increasing the main magnetic flux generated at the power transmitting coil 1 (the power receiving coil 2).

(Second Variation)

FIG. 5 shows a variation in which portions of the wound coil 5 that extend on the outward face of each magnetic bar member 4 have a horizontally-oriented oval cross section, and the wound coil 5 entirely covers the outward face of each magnetic bar member 4, inclusive of the terminal ends. With this configuration, the unwanted magnetic fluxes formed by magnetic coupling to the magnetic-shielding aluminum plates 3 are further reduced, thereby allowing for preventing the magnetic-shielding aluminum plates 3 from being heated.

(Third Variation)

FIG. 6 shows a variation in which, out of portions of the wound coil 5 that extend on the outward face of each magnetic bar member 4, the ellipticity of the portions extending on the middle portion is different from that of the portions extending in the terminal end portions. Usually, the main magnetic flux and the unwanted magnetic fluxes are not uniformly generated with respect to the power transmitting coil 1 (the power receiving coil 2). Therefore, flattening the initial and terminal portions of the wound coil where the magnetic fluxes are easily generated allows for making the element wires in the Litz wire come into uniform contact with the magnetic field, which enables currents to flow uniformly through the element wires in the Litz wire. This configuration thus allows for reducing the loss in the Litz wire.

(Fourth Variation)

Figure 7:
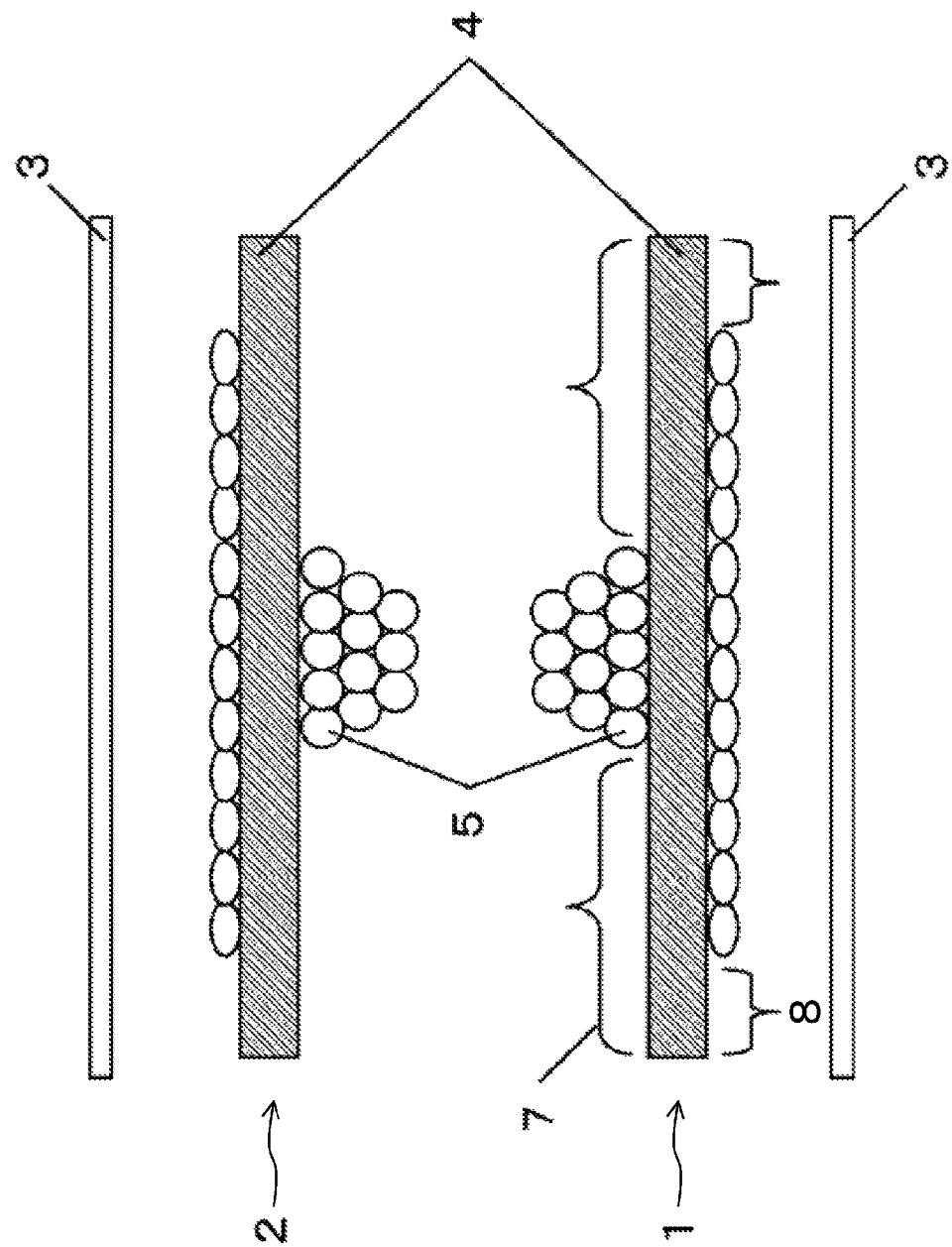
FIG. 7 is a cross-sectional view showing a non-contact charging apparatus according to a fourth variation of the present disclosure.

FIG. 7 shows a variation in which portions of the wound coil 5 that extend on the inward face of each magnetic bar member 4 are arranged in multiple layers (in multiple tiers). This configuration, in which the coil 5 is wound such that the number of the tiers formed by portions of the wound coil 5 that extend above the outward face of each magnetic bar member 4 is less than the number of the tiers formed by portions of the wound coil 5 that extend above the inward face, enables reduction of the magnetic coupling to the magnetic-shielding aluminum plates 3. Thus, this configuration allows for reducing the unwanted magnetic fluxes and preventing the magnetic-shielding aluminum plates 3 from being heated.

(Fifth Variation)

Figure 8:
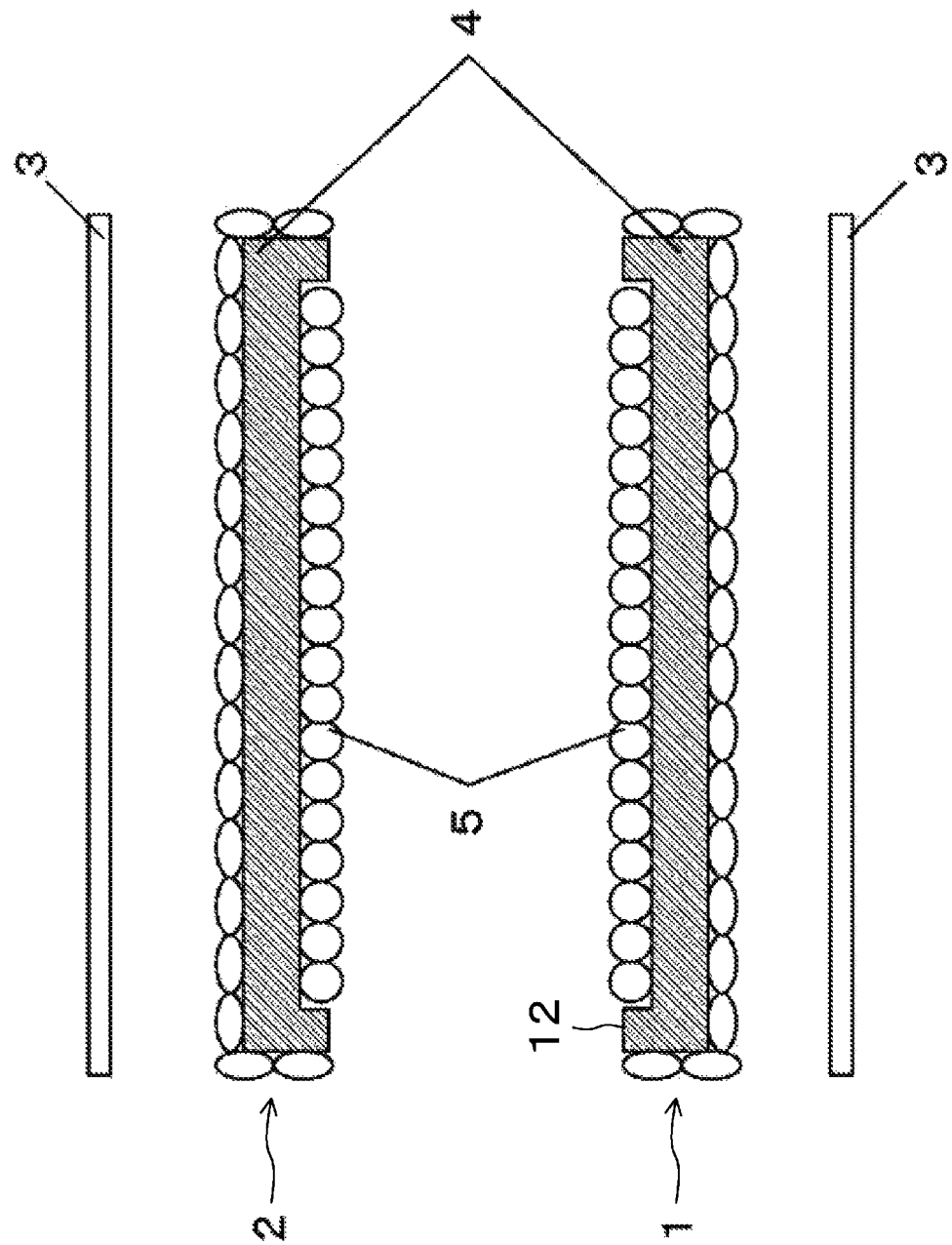
FIG. 8 is a cross-sectional view showing a non-contact charging apparatus according to a fifth variation of the present disclosure.

FIG. 8 is a cross-sectional view showing a non-contact charging apparatus according to a fifth variation of the present disclosure. The magnetic bar member 4 of each of the power transmitting and receiving coils 1 and 2 of this variation has, at its terminal ends, projections 12 that project toward the opposite coil. These projections 12 at the terminal ends enable efficient transmission of the magnetic fluxes generated at the power transmitting coil 1 (the power receiving coil 2) to the opposite coil. If the top face of each projection 12 is designed to be lower than the top of the turns of the coil 5, the leakage of the magnetic fluxes to the surroundings is further reduced. The advantages of the present disclosure can be obtained, however, even with the projections 12 of which the top face is higher than the top of the turns of the coil.

In this variation, each magnetic bar member 4 is entirely covered with the coil 5, except the top faces of the projections 12. Since the number of the turns of the wound coil on the inward face is the same as that on the outward face, the portions of the coil 5 that extend on the outward face are made to have a horizontally-oriented oval cross section. With this configuration, the unwanted magnetic fluxes formed by magnetic coupling to the magnetic-shielding aluminum plates 3 are reduced, which allows for preventing the magnetic-shielding aluminum plate 3 from being heated.

To match the number of the turns of the wound coil 5 on the inward face to that on the outward face, the portions of the coil 5 that extend on the inward face may be made to have a vertically-oriented oval cross section as with the first variation. The same or similar advantages are obtained by making the coil have a shape as shown in any of the other variations.

(Manner of Winding Coil)

Figure 9:
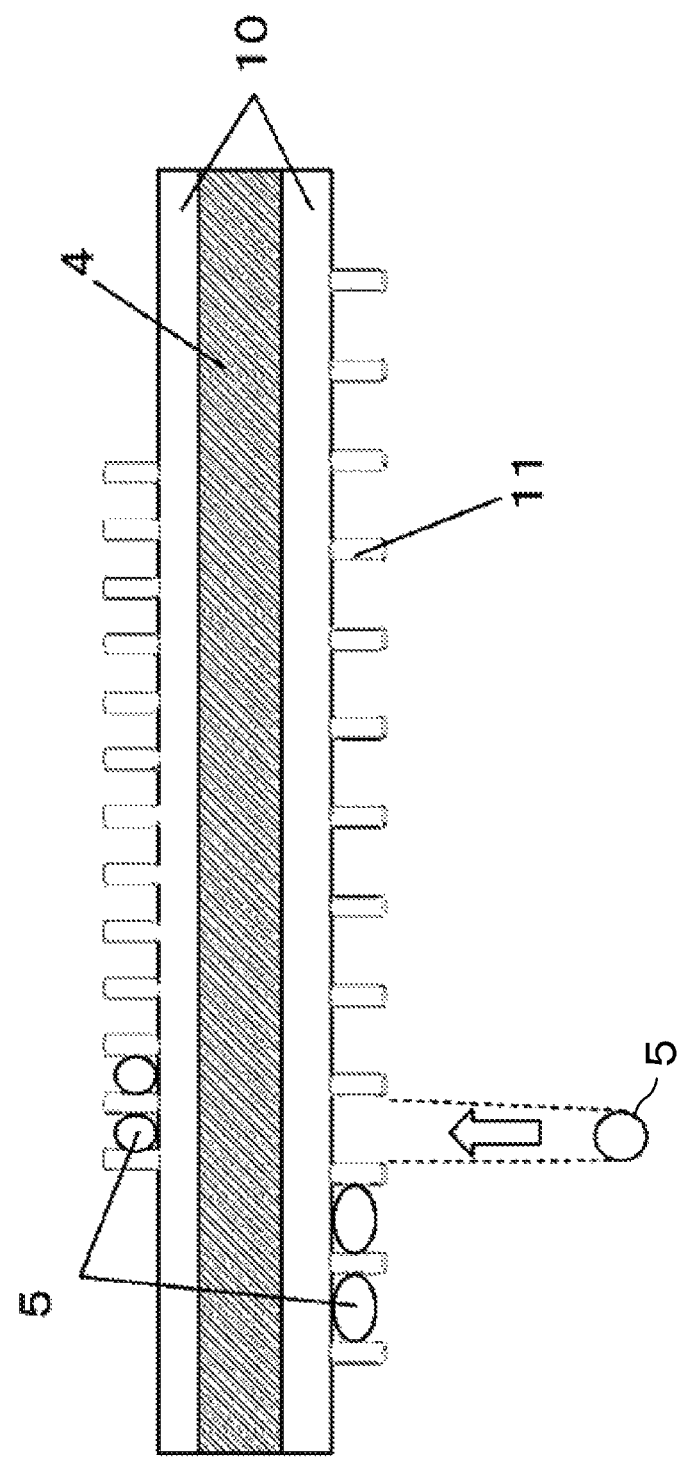
FIG. 9 is a cross-sectional view showing a manner of winding a coil around a case of a magnetic body.
Figure 10:
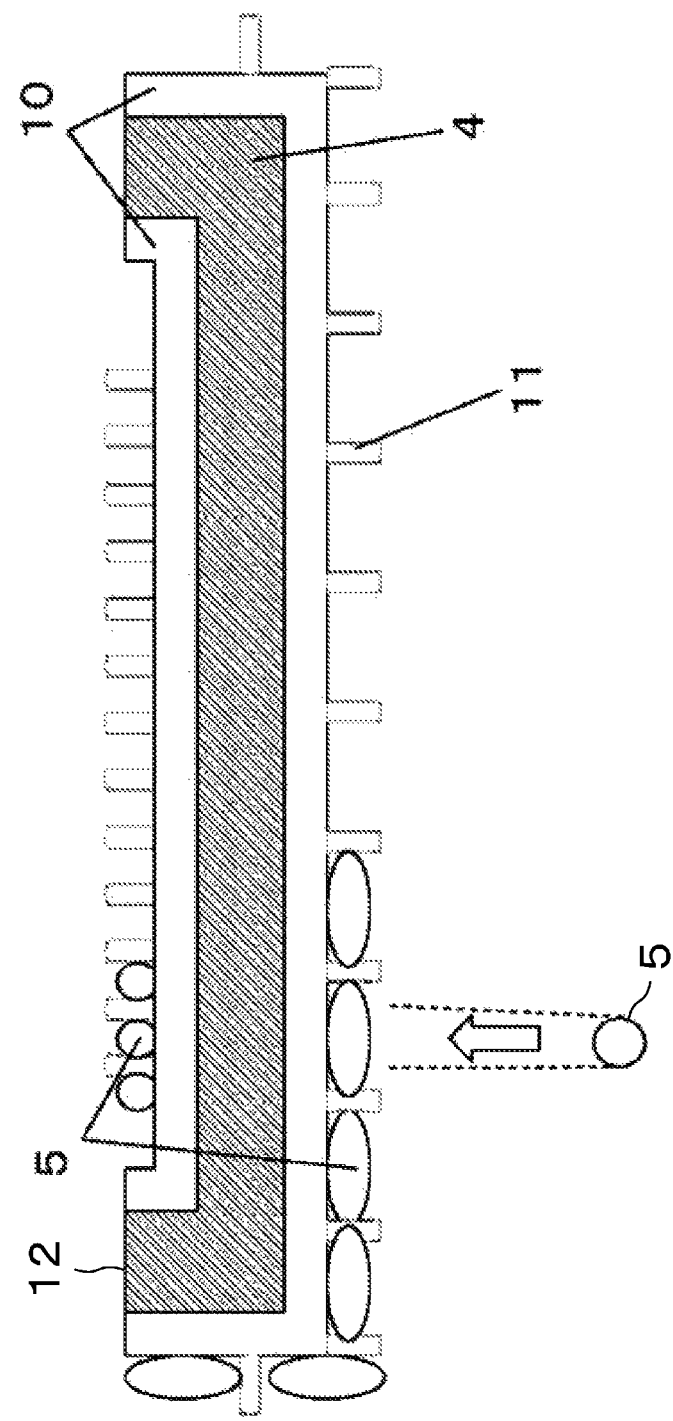
FIG. 10 is a cross-sectional view showing a manner of winding a coil around a case of a magnetic body.
Figure 11:
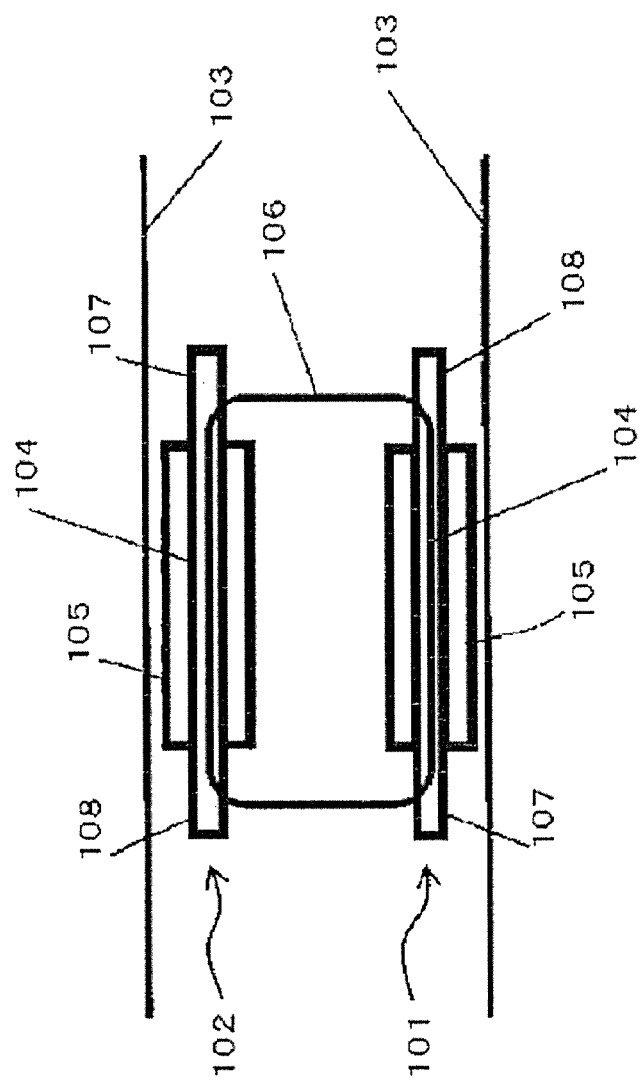
FIG. 11 is a cross-sectional view showing a non-contact charging apparatus of the known art.

FIGS. 9 and 10 each show an example manner of winding the coil 5. A case 10 which covers the magnetic bar member 4 has ribs 11 between which the coil 5 is wound. The ribs 11 are arranged over the outer periphery of the magnetic bar member 4 at intervals in the winding direction of the coil 5. As indicated by the arrow in FIGS. 9 and 10, the coil 5 is wound with tension applied to the coil 5 such that the wound coil 5 extends between the ribs 11. If the intervals between the ribs 11 are narrowed, the coil 5 will have a vertically-oriented oval cross section. If the intervals between the ribs 11 are widened, the coil 5 will have a horizontally-oriented oval cross section. Although FIGS. 9 and 10 show the examples in which the wound coil 5 extends between some of the ribs 11, the coil 5 is wound such that the coil 5 extends between adjacent ones of all of the ribs 11.

In the examples shown in FIGS. 9 and 10, the ribs 11 are arranged at regular intervals. However, the ribs 11 do not have to be arranged at regular intervals. For example, as shown in the third variation, the intervals between the ribs 11 may be varied along the same face. Alternatively, the ribs 11 may be arranged at random intervals.

One of the features of the present disclosure is the manner of winding the coil 5, by which the arrangement of the turns of the wound coil on the inward face is different from that on the outward face (i.e., on the magnetic bar member 4, the regions covered with the coil 5 on the inward and outward faces have different sizes). The manner of winding is not limited to one with the use of the ribs 11. For example, the same or similar advantages are obtained by any other manner of winding without using the ribs 11, as long as the ellipticity of the coil can be varied.

The present disclosure has been described with reference to the examples in which the coil 5 is wound without leaving any clearance between its turns. However, clearances may be left between some of the turns as long as the outward region 8 is smaller than the inward region 7.

In order to efficiently obtain the advantages of the present disclosure, it is suitable that the configuration of the present disclosure is adopted into both of the power transmitting and receiving coils 1 and 2. However, the advantages are also obtained even if only one of the coils 1 and 2 has the configuration of the present disclosure. Further, the advantages can be obtained even if the coils have configurations according to different variations.

The use of the power transmitting coil 1 and the power receiving coil 2 that are configured as described above allows for reducing the magnetic coupling to the magnetic-shielding aluminum plates 3, that is, the unwanted flux loops 9, and improving the efficiency of charging and the safety. Further, the apparatus of the present disclosure allows for reducing the leakage of the magnetic fluxes to the surroundings, thereby making it difficult to heat electrical components which are placed near the apparatus and foreign metal objects which may become near the outer periphery of the apparatus. Thus, the safety is increased further.

The present invention is applicable to non-contact charging apparatuses for charging electric propulsion vehicles such as electric vehicles and plug-in hybrid vehicles.

What is claimed is:

1. A non-contact charging apparatus comprising a power transmitting coil and a power receiving coil which face each other, wherein
   at least one of the power transmitting coil or the power receiving coil includes:
      a magnetic body, and
      a coil wound around the magnetic body,
   the magnetic body has, on both end portions, exposed regions in which the wound coil is absent,
   out of the exposed regions, one which is on a face of the magnetic body facing the power transmitting coil or the power receiving coil is larger than another one which is on a face of the magnetic body not facing the power transmitting coil or the power receiving coil,
   over an outer periphery of the magnetic body, a plurality of ribs are arranged at intervals in a winding direction of the coil,
   an interval between adjacent ones of the ribs arranged on a face facing the power transmitting coil or the power receiving coil is narrower than an interval between adjacent ones of the ribs arranged on a face not facing the power transmitting coil or the power receiving coil, and
   the coil is wound between the ribs.

2. The non-contact charging apparatus of claim 1, wherein the coil is implemented as a single continuous coil.

3. The non-contact charging apparatus of claim 1, wherein the number of tiers formed by portions of the wound coil which extend above a face not facing the power transmitting coil or the power receiving coil is less than the number of tiers formed by portions of the wound coil which extend above a face facing the power transmitting coil or the power receiving coil.

4. The non-contact charging apparatus of claim 1, wherein the magnetic body has no exposed regions on both end portions of the face not facing the power transmitting coil or the power receiving coil.

* * * * *